Aug. 12, 1952     L. L. DREIBELBIS     2,606,725
LAUNCHING DEVICE
Filed Sept. 24, 1946     2 SHEETS—SHEET 1
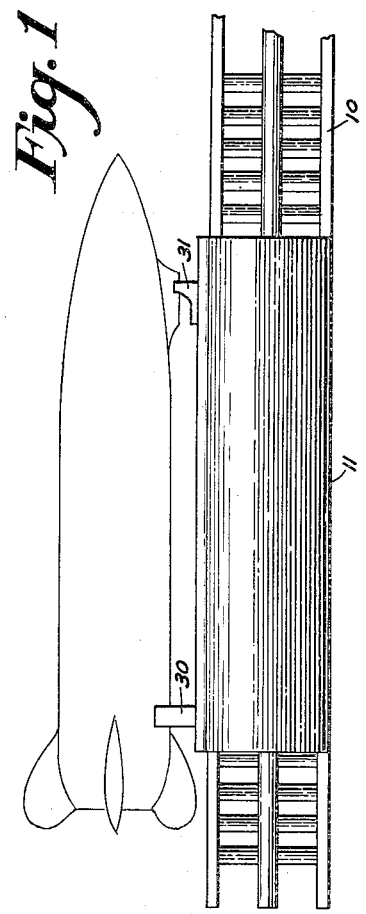
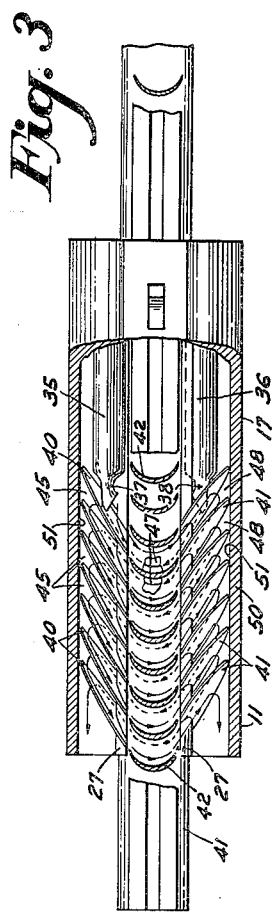
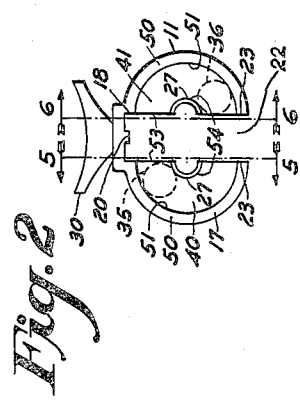
INVENTOR.
Logan L. Dreibelbis
BY Virgil F. Darrco
ATTORNEY Aug. 12, 1952 — L. L. DREIBELBIS — 2,606,725
LAUNCHING DEVICE
Filed Sept. 24, 1946 — 2 SHEETS—SHEET 2
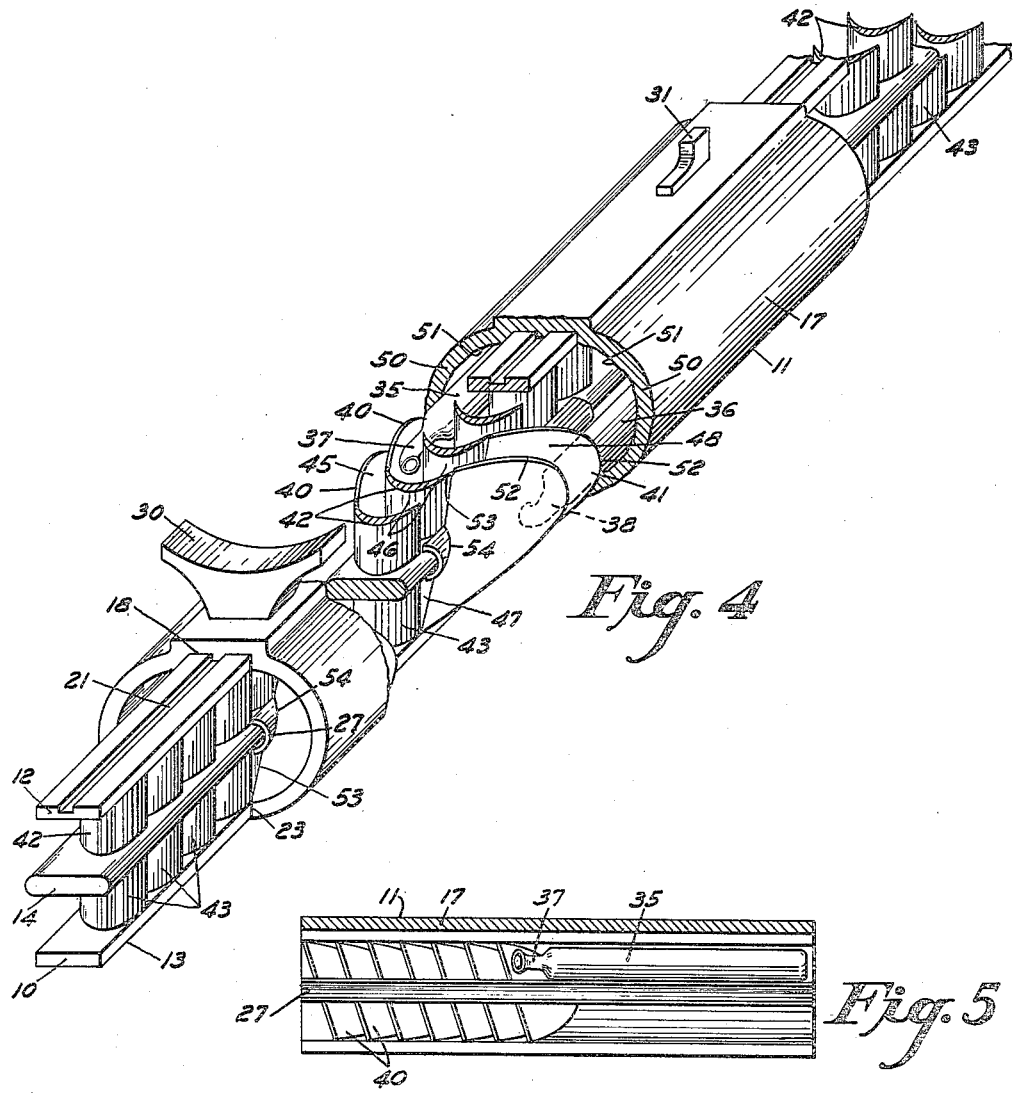
INVENTOR.
Logan L. Dreibelbis
BY Virgil F. Davies
ATTORNEY Patented Aug. 12, 1952

2,606,725

UNITED STATES PATENT OFFICE 2,606,725

LAUNCHING DEVICE

Logan L. Dreibelbis, New York, N. Y., assignor to The M. W. Kellogg Company, New York, N. Y., a corporation of Delaware Application September 24, 1946, Serial No. 698,893

3 Claims. (Cl. 244—63)

1

The present invention relates to an apparatus for launching at high velocity an airborne device, such as a rocket or missile.

One known arrangement for launching a rocket or missile comprises a piston propelled in a split tube by the pressure action of a liquid or solid fuel, and having a releasable connection to the rocket or missile. Launching arrangements of this type are extremely heavy, and may weigh as much as 120 tons. Furthermore, such launching arrangements are difficult and expensive to manufacture, especially since they require comparatively complicated pressure seals for the tube. Moreover, there is a critical limit to the length of the tube permitted, because theoretically the velocity of the piston in the tube cannot exceed sonic speeds.

Another known arrangement for launching a rocket or missile comprises a ramp and a carriage, movable therealong, which carries the rocket or missile. The carriage does not include a power plant of its own and is propelled along the ramp solely by the jet reaction of the rocket motors of said rocket or missile. This arrangement is lighter and simpler than the piston and tube type of launching device described above. However, as it employs the fuel of the rocket or missile itself to impart the launching impetus it materially cuts down the range of the missile or rocket.

Still another known arrangement for launching rockets or missiles, comprises a ramp along which a rocket or missile-supporting carriage is movable. The carriage carries its own power plant, in the form of rocket motors for propelling said carriage and said rocket or missile along the ramp. A launching device of this general type is much lighter and simpler than the piston and tube type of launching device described above and does not impose limitations on the range of the missile or rocket as does the first type of carriage launching device described above.

Both types of carriage launching devices described have the disadvantage that the fuel consumed for launching is utilized in an uneconomical manner since a large portion of the energy generated by the fuel is permitted to go to waste. In both types of carriage launching devices described, only the jet reaction of the gases issuing from the rockets is made available and all of the kinetic energy of said gases is wasted.

Among the objects of the present invention are to provide a new and improved propelling device which is free from the objections of the prior

2 launching devices above noted, which is comparatively light, but nevertheless sturdy, and which is comparatively easy to manufacture and assemble, and which is adaptable for construction in any desired operating lengths.

Among other objects are to provide a new and improved propelling device which has a comparatively low specific fuel consumption, which is capable of launching an airborne device such as a rocket or missile at much higher velocities than those afforded by the launching devices of the prior art, and with a first stage or launching travel not greater than that required by the prior art devices, and which is flexible in its application to the launching of all types of missiles or rockets.

In carrying out certain features of the present invention the available residual kinetic energy of the launching propellant exhausted from rocket motors is employed to impart additional launching impetus to the airborne device being launched.

As a further feature, the device to be launched is detachably carried by a carriage slidable along a launchway, and having rocket motor means for imparting a launching thrust to said carriage. A blading arrangement is employed to absorb in successive stages available energy from the exhaust of the rocket motor means of the carriage and convert it into additional carriage launching thrusts.

As an additional feature, the available kinetic energy of the exhaust from the rocket motor means of the carriage is utilized by a velocity compounding blading system to generate the additional carriage launching thrusts.

Various other objects, features and advantages of the invention will be apparent from the following particular description, and from an inspection of the accompanying drawings, in which:

Fig. 1 is a side view of a launching arrangement, embodying the present invention, with a rocket or missile positioned thereon for launching;

Fig. 2 is an end view of the carriage of the invention;

Fig. 3 is a plan view, partly in section, of the arrangement of Fig. 1 with the missile removed;

Fig. 4 is a perspective view of a portion of the ramp and carriage embodying the present invention, parts of the outer carriage wall being shown broken away to reveal the construction within said carrage in relation to the construction of the ramp;

Fig. 5 is a section taken on line 5—5 of Fig. 2; and

Fig. 6 is a section taken on line 6—6 of Fig. 2.

Referring to the drawings, the launching device comprises a launchway 10, of extended length, in the form of a beam-like ramp, fastened to the ground in a suitable manner (not shown), and slidably carrying a carriage 11 on which an airborne unit, such as the rocket or missile to be launched, is detachably supported. The ramp 10 comprises an upper bed plate 12 for the carriage 11, a lower guide plate 13 for said carriage, and a rail plate 14 also for said carriage. All of these plates 12, 13 and 14 in the form of long bars are arranged in parallelism longitudinally of the ramp 10, and are rigidly interconnected by a series of blades in a manner to be described, so that said ramp has great strength and rigidity, although it is comparatively light.

The carriage 11 comprises a substantially tubular frame 17 open at its ends, and slidably embracing the ramp 10. The carriage 11 has a longitudinal recess 18 at its upper side receiving the bed plate 12 with a slide fit. To aid in resisting the torsional thrust on the carriage 11 as it is propelled along the ramp 10, said carriage has a rib 20 along its upper side extending downwardly into a slot 21 in the bed plate 12 to form a slide joint therewith.

Along its lower side, the carriage frame 17 has a longitudinal slot or opening 22 in which extends the lower guide plate 13 of the ramp 10 with a slide fit. The longitudinal edges 23 of the wall of the carriage frame 17 on the sides of the bottom slot 22 engage the respective side edges of the guide plate 13, so that this plate aids in guiding the carriage 11 along the ramp 10, and in resisting the torsional thrust on said carriage as it is propelled along said ramp.

The carriage frame 17 has rigid therewith in a manner to be described, a pair of parallel channel-shaped runners 27 extending lengthwise thereof, and embracing the side edges respectively of the rail ramp plate 14 with a slide fit. These runners 27 are shown of semi-circular cross-section, and the side edges of the rail plate 14 are shown of corresponding cross-section. The rail plate 14 in conjunction with the runners 27 serves not only to guide the carriage 11 in its launching movement along the ramp 10, but also aids in resisting the torsional thrust on said carriage as it is propelled along said frame.

The carriage 11 is provided with a rest or support 30 for the rear section of the rocket, missile or other airborne device to be launched, and also a hook 31, which is adapted to releasably engage the forward section of said device, and which serves to transmit the endwise thrust of the propelled carriage 11 to said device. After the rocket or missile has been hurled into the air, the carriage 11 remains behind, while said rocket or missile continues its flight.

The carriage 11 is propelled along the ramp 10 by a power plant of its own capable of releasing high velocity fluid jets and preferably comprising one or more rocket motors, two of such motors 35 and 36 being shown rigidly attached to said carriage. The rocket motors 35 and 36 may be of any suitable type carrying solid or liquid incendiary or explosive charges, and are shown comprising a pair of slender cylinders extending in the carriage frame 17 lengthwise thereof, and disposed on opposite sides of the axis of said carriage. The rocket motors 35 and 36 terminate at their rear outlet ends in respective nozzles 37 and 38, from which the products of combustion are exhausted in the form of high velocity gas jets from said motors. The carriage 11 is propelled forwardly along the ramp 10 by the thrust reaction or recoil produced from these jets in a manner well-known in the art.

As the exhaust gases are discharged from the rocket nozzles 37 and 38, as much as 95% of the available energy may still be retained in these gases. Therefore, if these gases are exhausted at high velocity into the atmosphere, as in the prior devices, a substantial fuel waste results. Furthermore, the extent of power imparted to the carriage 11 merely by the jet thrusts, is limited, and the carriage will therefore not be propelled at the desired high rate of acceleration, and will not approach supersonic speed, which, under certain conditions, is a desideratum.

As a feature of the present invention, the available kinetic energy in the jets emerging from the rocket nozzles 37 and 38, is converted by a blading system into additional carriage launching impulses. As a further feature, this blading system is arranged to compound the velocity of the exhaust jets, so that the available kinetic power from said jets is absorbed and transmitted to the carriage 11 in successive blading stages.

In the form of the invention shown, there are provided two rows of substantially parallel blades 40 and 41 on opposite sides of the longitudinal axis of the carriage 11, rigid with said carriage so as to be movable therewtih, and closely flanking a row of two superposed series of substantially parallel partially reversing guide blades 42 and 43 fixed to and separated by the rail ramp plate 14. The fixed guide blades 42 and 43 extend substantially at right angles with the rail plate 14, are rigidly connected to said rail plate, as for example, by welding, and are preferably arranged so that the blades 42 of the upper series are in registry or alignment with respective blades 43 of the lower series.

The movable carriage blades 40 and 41 are substantially flat, and extend obliquely outwardly and forwardly, with respect to a vertical plane passing through the longitudinal axis of the carriage 11, and substantially tangentially to the direction of flow at the entrance and exit sections of the fixed blade passages 46 and 47 defined by the ramp blades 42 and 43. The clearances between successive carriage blades 40 and 41 correspond to the clearances between successive fixed blades 42 and 43.

The blades 40 are also inclined obliquely downwardly and forwardly of the carriage 11 at a pitch equivalent to the fixed blade clearance, so that when each movable blade passage 45 defined by carriage blades 40 registers at its top inner side fully or centrally with a fixed upper blade passage 46, it registers at its bottom inner side fully with the fixed lower blade passage 47 just ahead of said fixed upper blade passage 46. In the phase position shown in Fig. 4, the inner straight edge of each of the carriage blades 40 will extend diagonally of the adjoining side of a corresponding pair of vertically aligned fixed blade passages 46 and 47.

The carriage blades 41 are inclined obliquely downwardly and rearwardly, instead of downwardly and forwardly, as in the case of the carriage blades 40, and this inclination is at a pitch equivalent to the fixed blade clearance, so that when each movable blade passage 48 defined by said carriage blades 41 registers at its top inner side fully with an upper fixed blade passage 46, it registers at its bottom inner side fully with the lower fixed blade passage 47, just behind said upper fixed blade passage 46. In the phase position shown in Fig. 4, the inner straight edge of each of the carriage blades 41 will extend diagonally of the adjoining side of a corresponding pair of vertically aligned blade passages 46 and 47, but at an inclination opposite to that of the inner edges of the carriage blades 40.

The carriage frame 17 has its side walls 50 regularly curved substantially circularly or elliptically, to afford an inner wall surface 51 of corresponding streamline contour, and the carriage blades 40 and 41 have outer edges 52 correspondingly curved to engage conformably with said inner carriage wall surface 51, and rigidly secured to said wall surface, as for example, by welding therealong.

The carriage blades 40 and 41 are substantially straight at their inner edges 53, except for slots 54 cut out to snugly receive the carriage runners 27, and are made rigid with these runners as for example, by welding at said inner blade edges around said slots.

The carriage blades 40 and 41 are disposed along the rear section of the carriage frame 17, while the fore section of said frame is free from these blades, and is cleared to receive the two rocket motors 35 and 36. The rocket motors 35 and 36 are desirably arranged in diametrically opposite relationship with respect to the longitudinal axis of the carriage 11.

The exhaust nozzle 37 on the discharge end of the rocket motor 35 is of diverging character, to expand the combustion gases from said motor down almost to atmospheric pressure, and to convert thereby the pressure energy of these gasses into energy of velocity. This nozzle 37 is curved inwardly and rearwardly towards the vertical plane of the longitudinal axis of the carriage 11 as shown in Fig. 3, and follows substantially the plane of the first carriage blade 40, so that it brings the high velocity jet smoothly and without shock either within the guiding field of action of the upper section of said first carriage blade, or directly into and tangentially of the entrance side of the first operating blade passage 46 in the upper part of the ramp 10.

The exhaust nozzle 38 at the rear end of the rocket motor 36 is also of the diverging type to expand the combustion gases down to atmospheric pressure, and thereby convert the pressure energy of these gases into energy of velocity. The exhaust nozzle 38 is curved inwardly and rearwardly towards the vertical plane of the longitudinal axes of the carriage 11, and along the first carriage blade 41 to afford maximum carriage launching jet thrust, and to effect smooth delivery of the exhaust jet into the guiding field of action of the lower section of said first carriage blade 41, or directly into and tangentially of the first fixed operating blade passage 47 in the lower part of the ramp 10.

The two high velocity exhaust jets from the nozzles 37 and 38 are directed clockwise (Fig. 2), and rearwardly, with respect to the carriage 11 by the blading system described, and are velocity compounded as they pass through said system. As the streams from the two nozzles 37 and 38 pass through the different stages of the blading system, parts of one stream are merged with parts of the other, while two motive streams are continuously maintained throughout the blading system, and two streams are therefore continuously discharged from the rear end of the carriage, each constituting a mixture from the two original streams.

The device is shown in Fig. 3 during one phase of launching operation. For the sake of simplicity, the arrow lines in this Fig. 3 refer to the flow of the outer peripheral layers of the two streams. The dotted flow lines refer to the course of the parts of the outer stream layers below or behind the rail ramp plate 14, as for example, the course through the lower series of fixed blade passages 47, while the full flow lines represent flow of the parts of the outer stream layers which are above said rail ramp plate 14, or which are visible in the top plan view shown.

In the operation of the device, indicated especially in Figs. 3 and 4 and now described in connection with the course of the outer peripheral layer of the jet exhausted from the rocket motor 35, while the carriage 11 carrying the rocket or missile to be launched is at the lower end of the ramp 10, said rocket motor is fired, causing a jet thrust tending to propel the carriage along said ramp. The high velocity jet expelled from the rocket motor nozzle 37 is guided into the first operating upper fixed blade passage 46 in a direction substantially tangentially to the direction of flow at the entrance side of said passage, is guided in said fixed passage 46 in a partially reversed direction, and is led from said passage into the upper section of the first movable blade passage 48 in a direction substantially tangentially with respect to the exit side of said fixed passage, and in the direction of flow through said movable passage. As the high velocity gas stream travels along the upper section of the first movable blade passage 48, it impinges against the inner curved surface 51 of the carriage frame wall 50, and is forcibly deflected thereby out of its free path, thus imparting to the carriage 11 a forward launching impulse thrust at the first velocity compounding stage. The gas stream is deflected and guided in a substantially reverse direction obliquely of the longitudinal axis of the carriage 11 from the upper section to the lower section of the first movable passage 48, and is led from the lower section of said passage into the lower fixed blade passage 47, which is in full registry therewith, and which is displaced one fixed passage step behind the upper fixed blade passage 46 in full registry with the upper section of said movable passage 48. The stream is guided into this lower fixed passage 47 in a direction substantially tangentially to the entrance edges of the lower blades 43 defining said latter fixed blade passage, is partially reversed in direction in said latter fixed blade passage, and is directed therefrom into the lower section of the second movable blade passage 45. This stream is directed in this second movable blade passage 45 against and along the inner surface 51 of the carriage frame wall 50, thereby imparting to the carriage 11 an impulse thrust having a substantial component in the direction of forward launching movement of the carriage. The gas stream in this second movable blade passage 45 constituting a velocity compounding stage of the blading system flows in a substantially reverse direction obliquely of the longitudinal axis of the carriage 11 from the lower section of said second movable blade passage 45 into the upper section of said latter passage, and enters in a substantially tangential direction the upper fixed blade passage 46 in full registry with the upper section of said second movable blade passage 45, and one passage step behind the lower fixed blade passage 47, which is in full registry with the lower section of said second movable blade passage 45. The gas stream is guided from the last-mentioned upper fixed blade passage 46 substantially tangentially into the upper section of the third movable blade passage 48 constituting a subsequent velocity compounding stage, where it imparts a forward launching impulse to the carriage 11 in a manner already described in connection with the other two velocity compounding stages. The process is repeated through all of the stages of the blade system until the stream is discharged from the outer guide face of the last blade 41.

The gas stream in passing through successive stages of the blade system, will impart forward impulse launching power to the carriage frame 17 by impingement against the inner wall surface 51 thereof, and will be continuously slowed down in velocity, until it is discharged from the last stage at a velocity much less than that of the initial jet. The total thrust on the carriage 11 tending to propel it along the ramp 10 and resulting from the velocity compounding blading system described, will be the summation of the impulse thrusts effected at the different stages, and will add greatly to the launching force derived solely from the jet thrust at the rocket motor 35.

The action of the jet emerging from the nozzle 38 of the rocket motor 36 is similar to that of the jet emerging from the nozzle 37 of the rocket motor 35 already described. The jet from the nozzle 38 is projected either into the guiding field of action of the lower section of the first forward carriage blade 41, or directly into the first operating lower fixed blade passage 47 opposite said nozzle. The outer peripheral layer of the gas stream from this lower fixed blade passage 47 then passes into the lower section of the first movable blade passage 45 between the first two carriage blades 40, where it imparts a forward launching impulse to the carriage 11 by the impingement action of said stream against the inner carriage wall surface 51, and flows upwardly and reversely therein to the upper section of said first movable blade passage and tangentially into the second operating fixed blade 46 shown in Fig. 4. From this second operating fixed blade passage 46 shown, the gas stream is partially reversed in direction and passed into the second movable blade passage 48, where it imparts a forward launching impulse to the carriage 11 by the impingement action of said stream against the inner carriage wall surface 51. The stream then flows downwardly and reversely in this second movable blade passage 48 to the lower section thereof and enters therefrom into the lower fixed blade passage 47 one passage step behind the upper fixed blade passage 46 in full registry with the upper section of said second movable blade passage 48. From this lower fixed blade passage 47, the gas stream flows into the third movable blade passage 45, where the impulse action of the stream against the carriage walls is repeated, but at reduced velocity. The operation is repeated through different stages of the blade system, the velocity of the stream being compounded in successive steps until it is discharged by the last blade 40.

It should be noted that in Figs. 3 and 4, the carriage 11 is shown at the instant when the movable blade passages 45 and 48 are in full registry at their upper and lower sections with the fixed blade passages 46 and 47 respectively. However, since the carriage 11 is movable along the ramp 10 during the launching period, the movable blade passages 45 and 48 at their upper and lower sections are only in partial registry with the fixed blade passages 46 and 47 respectively during most of this period. Therefore, at all times during launching, the movable blade passages 45 and 48 are in communication with the fixed blade passages 46 and 47.

Although, for the sake of simplicity, the operation of the device has been described in connection with the flow of the outer peripheral layers of the streams through fully registering blade passages, it must be understood that even in the phase of operation shown in Fig. 3, each movable passage 45 or 48 is in communication above its middle and below its upper section with two upper adjoining fixed blade passages 46, and below its middle and above its lower section with two lower adjoining fixed blade passages 47. Therefore, there is a continuous branching of each stream, the merging of the branches of the two streams, and the rebranching of the merged streams.

Summarizing the operation, each row of movable carriage blades 40 and 41 defines a plurality of velocity compounding stages on each side of the carriage. The rocket motor exhaust streams are directed rotationally around the axis of the carriage 11 and along alternate staggered course between the movable blade passages 45 and 48 of the two rows, and rearwardly through successive fixed guide passages 46 and 47. As the exhaust streams follow this course, the kinetic energy, due to their velocity, is transmitted by impulse directly to the carriage frame wall surface 51, to impart to the carriage 11 a forward impetus which adds greatly to the forward drive imparted to the carriage merely by the jet thrust from the rocket motors 35 and 36. These streams are made to follow streamline courses, due to the shaping of the blades and the shaping of the inner surface 51 of the carriage frame wall 50, so that maximum conversion of the available kinetic energy of the streams into useful work is effected.

Although the blading system of the present invention has been shown with the middle row of blades constituting the fixed blades, and the two outside flanking rows constituting the movable blades, as far as certain aspects of the invention are concerned, the middle row of blades may be rigid with the carriage 11, and constitute, therefore, the movable blades, while the two outside flanking rows of blades may be rigid with the ramp 10, and therefore constitute the fixed blades.

By compounding the velocity of the exhaust jets of the carriage rocket motors 35 and 36 as described, much higher launching velocities are obtained than are possible with prior art devices with the same ramp length, and the same fuel consumption.

While the invention has been disclosed in connection with the above described missile launching device, it is not limited thereto but is of general application and may be used to carry, push, or pull bodies of any nature along the path of the launchway and whether or not such bodies leave the carriage after a limited movement with the carriage or remain with the carriage to the end of its movement.

As many changes can be made in the above described embodiment of this invention, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A launching device for a rocket or missile, comprising a ramp provided with a longitudinal plate, a carriage substantially in tubular form and having curved inner side wall surfaces, said carriage being adapted to carry the rocket or missile to be launched, one or more rocket motor means carried by said carriage and extending therealong for imparting to said carriage a launching thrust, and means for converting at least part of the available kinetic energy of the jet exhaust from said rocket motor means into an additional launching thrust for said carriage, and comprising an upper set of fixed guide blades and a lower set of fixed guide blades secured to said plate and extending therealong, said blades extending from opposite faces of said plate and defining a series of upper fixed blade passages and a series of lower fixed blade passages, the blades of one set being disposed in substantial alignment with respective blades of the other set, said blades being curved to receive a stream moving in a direction obliquely towards the longitudinal axis of said ramp and rearwardly thereof, and to discharge it in a direction obliquely away from the longitudinal axis of said ramp and forwardly thereof, two rows of movable blades on opposite sides of said row of fixed blades rigid with said carriage and extending therealong, said movable blades extending substantially forwardly and obliquely with respect to the axis of said ramp, and having outer curved edges in conforming engagement with said carriage inner side wall surfaces, said movable blades having clearances corresponding to the clearances between the fixed blades and defining movable blade passages, each communicating with a pair of aligned upper and lower fixed blade passages, the movable blades of one row being tilted at a pitch corresponding to the clearance between the fixed blades, whereby the edge of each of said latter movable blades will extend diagonally of one side of a pair of aligned upper and lower fixed blade passages at one phase in the movement of the carriage along said ramp, while the movable blades of the other row are tilted at the same pitch but in the opposite direction, said one or more rocket motor means each having at its rear end a high velocity discharge nozzle adapted to discharge a high velocity jet near the head end of one of said rows of blades.

2. A launching device comprising a beam-like launchway having a pair of superposed substantially parallel longitudinal bar plates extending therealong and a series of curved stream guiding blades extending between and secured to said bar plates, and defining therebetween flow passages, a carriage supported by the upper of said bar plates substantially surrounding and movable along said launchway and adapted to carry the unit to be launched, means on said carriage for generating a high velocity gas jet, and blading means including said blades for absorbing at least a part of the available kinetic energy of said jet and converting it into carriage launching thrust.

3. A launching device comprising a beam-like launchway having three superposed substantially parallel longitudinal bar plates extending therealong, a series of curved stream guiding blades extending between and secured to the upper and middle bar plate and defining therebetween flow passages, a series of curved stream guiding blades extending between and secured to the middle bar plate and the lower bar plate and defining therebetween flow passages, a carriage movable along said launchway and adapted to carry the unit to be launched, means for generating a high velocity gas jet, and blading means including said blades for absorbing at least a part of the available kinetic energy of said jet and converting it into launching thrust.

LOGAN L. DREIBELBIS.

REFERENCES CITED

The following references are of record in the file of this patent:

UNITED STATES PATENTS

| Number | Name | Date |
|---|---|---|
| 553,622 | Lighthall | Jan. 28, 1896 |
| 1,411,597 | Trask | Apr. 4, 1922 |
| 1,803,320 | Christianson | May 5, 1931 |
| 1,869,212 | Peterson | July 26, 1932 |
| 2,307,125 | Goddard | Jan. 5, 1943 |
| 2,493,013 | Nelson | Jan. 3, 1950 |

FOREIGN PATENTS

| Number | Country | Date |
|---|---|---|
| 844,295 | France | Apr. 17, 1939 |